Nov. 23, 1937.  L. DE F. HOKERK  2,100,032
FLY SWATTER
Filed May 29, 1936
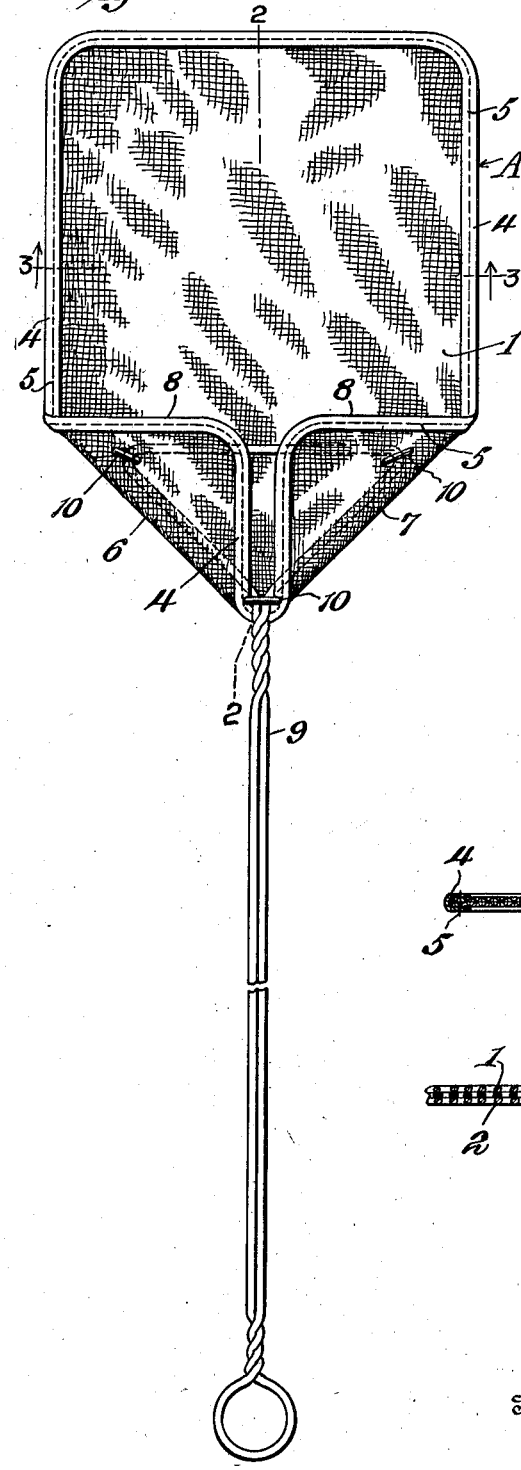
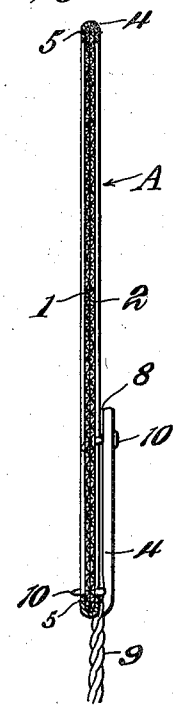
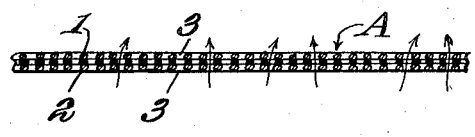

Patented Nov. 23, 1937

2,100,032

UNITED STATES PATENT OFFICE 2,100,032

FLY SWATTER

Lynde De F. Hokerk, Utica, N. Y., assignor to Kerk Guild, Inc., Whitesboro, N. Y., a corporation of New York Application May 29, 1936, Serial No. 82,666

3 Claims. (Cl. 43—137)

This invention relates to fly swatters.

One object of the invention is to provide a fly swatter head which may be readily secured to a wire or other handle to complete the article and in which the head is composed of a plurality of pieces of fabric or other suitable soft material glued or otherwise adhesively secured together to stiffen the same and yet provide for the requisite flexibility of the swatter head for an effective use of the same.

Another object of the invention resides in the provision of a fly swatter including the head consisting of a plurality of layers or plies of superimposed pieces of burlap and adhesive material applied to the inner opposed faces of the burlap layers to unite the same to form an unitary swatter head, the adhesive material, whatever character used being preferably of a nature to provide a stiffening element and convert the initially limp burlap into a relatively stiff, highly flexible swatter head possessing soft characteristics, the adhesive material uniting the layers or plies of burlap material together throughout the inner adjacent surfaces of the woven elements of which the burlap material is composed to effect the stiffening of the swatter head against the aforesaid limp condition and leaving uncoated or open certain, if not all, of the interstices of the burlap material to permit of the passage of air through the swatter head during use of the same.

A still further object of the invention resides in the provision of a fly or other insect swatter including a head composed of layers of material preferably of burlap so as to present a soft exterior surface at both outer faces of the swatter head and thereby provide a swatter head of such a nature as to prevent unsightly mutilation of the fly or other insect when he is struck with the swatter head and obviating possibility of scratches or marks on walls or furniture or the breaking of screens incident to the attack on the fly or insect.

With these and other objects in view, the invention consists in the construction and novel combination and arrangement of parts hereinafter fully described, illustrated in the accompanying drawing and pointed out in the claims hereto appended, it being understood that various changes in the form, proportion and details of construction, within the scope of the claims, may be resorted to without departing from the spirit or sacrificing any of the advantages of the invention.

In the drawing:—

Fig. 1 is a front view of the swatter.

Fig. 2 is a longitudinal sectional view on the line 2—2 of Fig. 1.

Fig. 3 is a sectional view on the line 3—3 of Fig. 1.

Fig. 4 is a fragmentary sectional view on an exaggerated scale to illustrate the adhesive material between the layers or plies of material of which the swatter head is composed.

Referring now more particularly to the accompanying drawing, the reference character A indicates a fly or other insect swatter head, which, in this instance, is composed preferably of two layers or plies of burlap of equal size and of any suitable dimensions.

The layers or plies 1 and 2 are secured together throughout the inner adjacent surfaces of the woven elements 3 of the burlap material by means of a suitable adhesive to stiffen the swatter head. Each layer or ply which is formed of limp fabric is composed of interlaced strands forming perforations, and the perforations of one layer register with the perforations of the other layer. The adhesive is applied to the strands around the perforations for uniting the layers together without interfering with the passage of air through said registering perforations in the use of the swatter head.

By virtue of the stiffening of the plies or layers of fabric by means of the adhesive agent the initially limp condition of the burlap material is converted into a relatively stiff, highly flexible soft swatter head.

By reason of the particular application of the adhesive agent to the inner adjacent faces of the plies or layers 1 and 2 the openings or interstices between the woven fabric are left free for the passage of air to facilitate effective use of the swatter.

The plies or layers 1 and 2 are secured together at their marginal edges, by means of tape or other soft fabric material 4, binding the marginal edge of the plies or layers together.

The binding material 4 is secured to the plies or layers 1 and 2 in any suitable manner, one character of means being by line of stitching 5.

The swatter head A at one end may be bent or folded at opposite corners along lines 6 and 7 to form a pocket 8 to receive the inner end of the handle 9 of wire or any other suitable material. The particular character of handle may be a common form and it is secured at its inner end in the pocket 8 by means of a suitable wire or other staple 10, as shown. Any character of handle may be employed and any character of securing means provided for attaching the handle to the swatter head.

It will be seen that I provide an economical insect swatter head composed of soft fabric material presenting outer soft surfaces to prevent scratching or marring of furniture when using the swatter. It will also be appreciated that use of the swatter or the bending of the swatter head material to provide the pocket 8 that stiff projecting elements do not result because of the nature of the burlap or similar fabric material employed in the formation of the swatter head. The outer surfaces of the swatter head are soft notwithstanding the use of the adhesive material to secure the adjacent or opposite inner faces of the plies or layers 1 and 2 together. This adhesive material is applied preferably in a manner to unite the strands of the fabric material without closing the interstices or openings between the strands of which the fabric is composed, providing for the passage of air through the swatter head when using the swatter. The use of burlap or similar material obviates the possibility of stiff projections liable to cut, bruise or otherwise injure the fingers or hand of one holding or using the swatter as in the case of broken or mutilated wire material sometimes used for the present purposes. The swatter head is soft and yet highly serviceable and it does not mutilate the fly or other insect badly when it is struck with the swatter head. The device will not mar furniture or scratch or break screen doors or screens.

What is claimed is:—

1. A fly swatter head comprising a plurality of layers of superimposed burlap, and adhesive material applied to the inner opposed faces of the burlap layers and uniting the same to form a unitary swatter head, said adhesive material forming a stiffening element and converting the initially limp burlap into a relatively stiff, highly flexible swatter head and arranged to leave uncoated and open certain of the interstices of the burlap for the passage of air through the swatter head in the use of the article, said burlap layers presenting a soft exterior surface at both faces of the swatter head.

2. A fly swatter head consisting of a plurality of superimposed layers, each layer being formed of limp fabric composed of interlaced strands forming perforations and the perforations of one layer registering with the perforations of the other layer, and adhesive material applied to the strands at the inner opposed faces of said layers around said perforations for uniting the layers together and not interfering with the passage of air through said registering perforations in the use of the swatter head, said adhesive material forming a stiffening element converting the initially limp fabric into a relatively stiff flexible swatter head.

3. A fly swatter head consisting of a plurality of superimposed layers, each formed of limp fabric composed of interlaced strands arranged to form perforations, and adhesive material between said layers uniting the layers together and forming a stiffening element converting the initially limp fabric into a relatively stiff flexible swatter head, and a handle secured to the swatter head.

LYNDE DE F. HOKERK.